(No Model.)
A. F. FROST.
RACK OR HOLDER FOR FRUIT JARS.
No. 517,380. Patented Mar. 27, 1894.
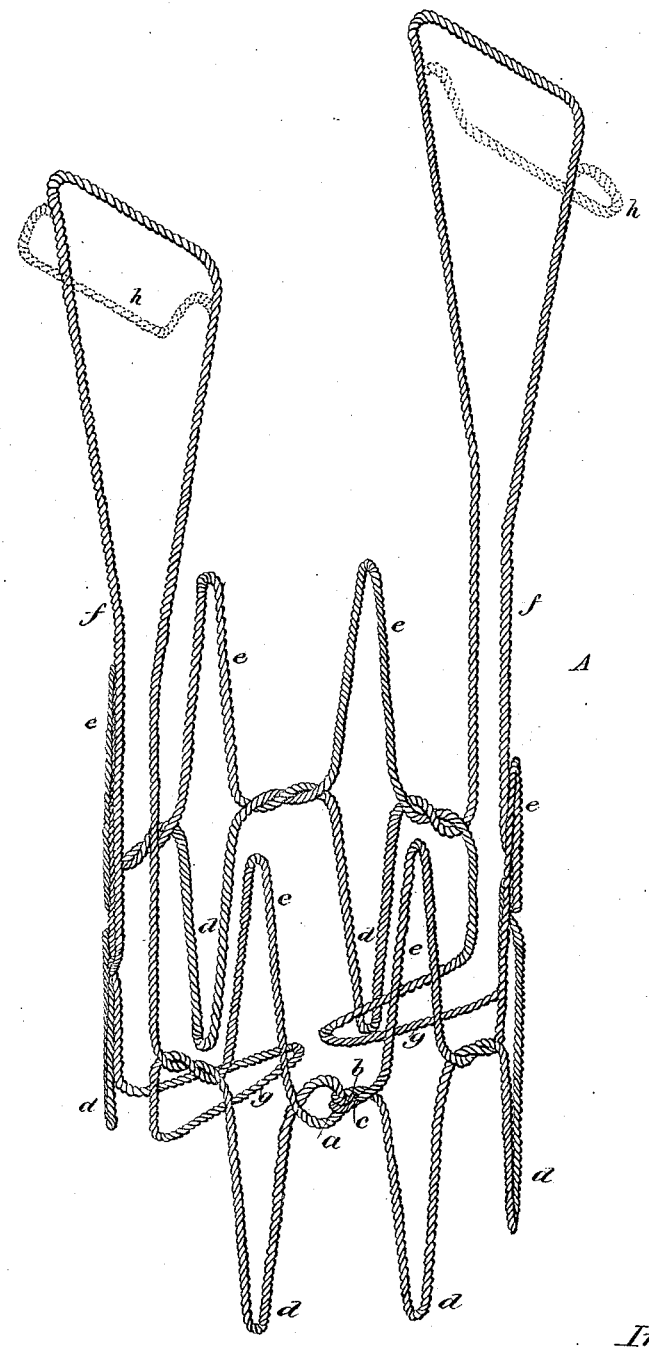
Witnesses
Inventor
A. F. Frost
By H. A. Seymour
Att'y

UNITED STATES PATENT OFFICE.

ARTEMISIA FRANCIS FROST, OF HIGHLAND, KANSAS.

RACK OR HOLDER FOR FRUIT-JARS.

SPECIFICATION forming part of Letters Patent No. 517,380, dated March 27, 1894.

Application filed September 22, 1892. Serial No. 446,588. (No model.)

*To all whom it may concern:*

Be it known that I, ARTEMISIA FRANCIS FROST, a resident of Highland, in the county of Doniphan and State of Kansas, have invented certain new and useful Improvements in Racks or Holders for Fruit-Jars; and I do hereby declare the following to be a full, clear, and exact description of the invention, such as will enable others skilled in the art to which it appertains to make and use the same.

My invention relates to an improvement in racks or holders for fruit jars, and the invention consists in certain novel features of construction and combinations and arrangements of parts as hereinafter set forth and pointed out in the claims.

The accompanying drawing illustrates my invention.

A represents a rack or holder, which is preferably made of a single wire, or if desired, in order to render the device more ornamental or to lend strength thereto, two or more wires twisted together may be employed, but which, in effect would be but a single wire.

In making the rack or holder, the wire is doubled upon itself and at the point where the wire is folded a loop $a$ is made, for the reception of the ends $b$, $c$, of the wire. Starting from the end $b$ the wire is bent to extend downwardly and then upwardly to produce a leg or rest $d$. The two wires $b$, $c$, are then twisted together and the wire $b$ extended upwardly and then downwardly to produce an arm $e$. The wires are again twisted together and another leg or rest $d$ is formed. Any desired number of legs or rests $d$ and arms $e$ may be made, according to the size of the rack to be produced, the wires $b$, $c$, producing alternate legs and arms. At diametrically opposite sides of the rack or holder, the wires are extended upwardly some distance, and preferably spread apart more or less at their upper ends, to produce handles $f, f$. Immediately beneath the handles $f, f$, two of the legs are bent at points between their ends and made to extend inwardly toward each other to produce rests $g$ for a jar. The legs or rests $d$ will preferably be made to project outwardly at the lower ends, so that when a jar is placed in the rack, the weight thereof and of its contents, on the jar rests $g$, will cause the arms $e$ to be forced inwardly and thus made to embrace and clamp the jar. By this means the jar will be held firmly in the rack. If desired more than two legs may be bent inwardly to produce jar rests. By constructing and arranging the rack or holder as above set forth, jars of different sizes may be inserted therein and be properly held in place, the elasticity contained in the circumference of the rack or holder by reason of the arrangement of legs and arms, providing this feature. The upper ends of the handles $f$ may be bent to form outwardly projecting hooks $h$ as shown in dotted lines whereby to suspend the device if desired from the upper edge of a boiler or other support.

By constructing the device as above explained a free circulation of water all around and on the bottom of the jar will be afforded, when the jar is suspended by means of my improved holder, into a boiler.

The device is simple in construction, cheap to manufacture and effectual in the performance of its functions.

Having fully described my invention, what I claim as new, and desire to secure by Letters Patent, is—

1. As an article of manufacture, a rack or basket for fruit jars and similar articles, composed of a single wire bent to form downwardly projecting legs and upwardly projecting arms, handles and bottom, said parts bent into circular form, substantially as set forth.

2. As an article of manufacture, a rack or basket for fruit jars consisting of a wire bent to form a loop or eye, thence in opposite directions to form upwardly projecting arms and downwardly projecting legs, bottom projections and handles, the entire device bent into circular form to conform approximately to the article to be held and the extreme ends of the wire fastened to the loop or eye, substantially as set forth.

In testimony whereof I have signed this specification in the presence of two subscribing witnesses.

ARTEMISIA FRANCIS FROST.

Witnesses:
JAMES A. LEONARD,
C. W. ROBERTSON.